J. R. PARTINGTON.
PROCESS FOR THE OXIDATION OF AMMONIA.
APPLICATION FILED OCT. 10, 1919.
1,378,271.
Patented May 17, 1921.
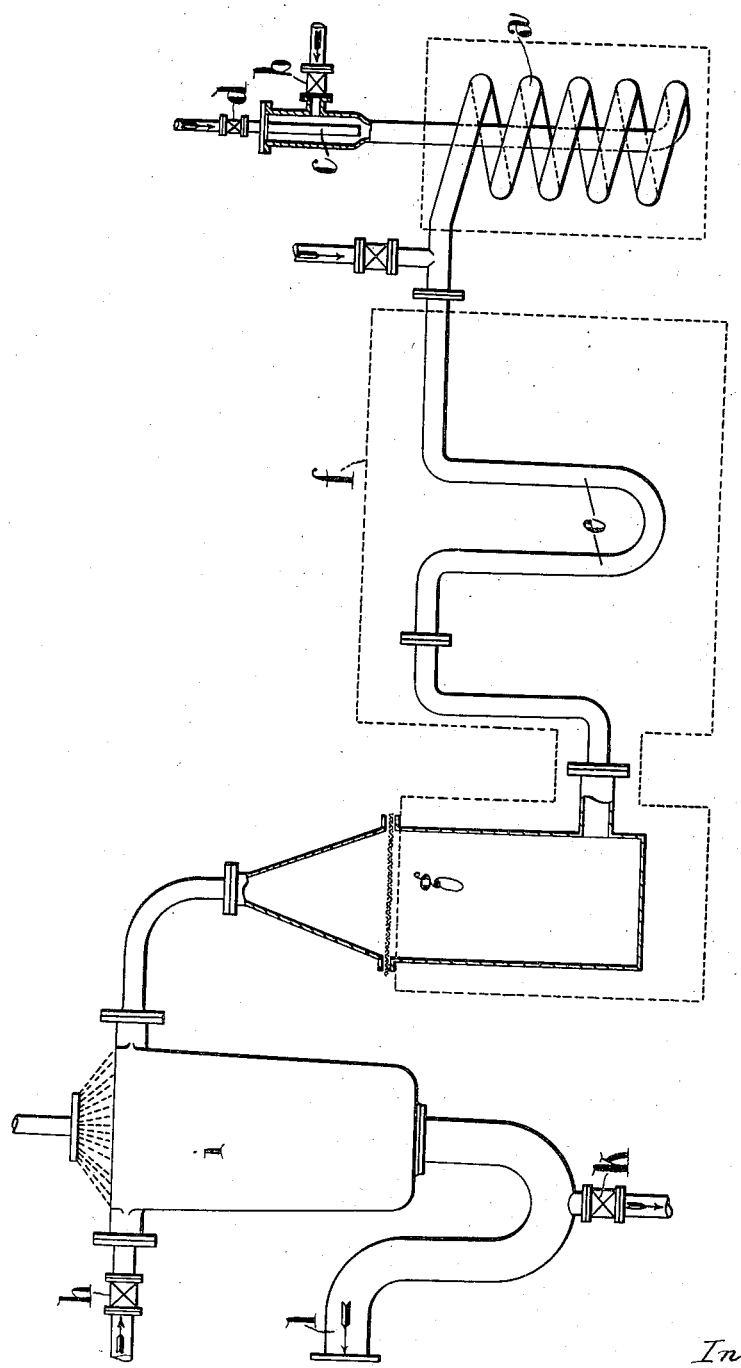
Inventor.
J. R. Partington.
By H. R. Kerslake
Atty.

UNITED STATES PATENT OFFICE.

JAMES RIDDICK PARTINGTON, OF LONDON, ENGLAND.

PROCESS FOR THE OXIDATION OF AMMONIA.

1,378,271.   Specification of Letters Patent.   Patented May 17, 1921.

Application filed October 10, 1919. Serial No. 329,878.

*To all whom it may concern:*

Be it known that I, JAMES RIDDICK PARTINGTON, a subject of the King of Great Britain and Ireland, residing in London, W. C. 1, England, have invented certain new and useful Improved Processes for the Oxidation of Ammonia, of which the following is a specification.

This invention relates to the oxidation of ammonia in a catalyst converter for the production of oxids of nitrogen or derivatives thereof.

In the processes ordinarily adopted for the oxidation of ammonia to oxids of nitrogen leading to the production of nitric acid, a mixture of ammonia gas and atmospheric air in suitable proportions is passed over a catalytic substance, such as metallic platinum in the form of foil or gauze, maintained at a suitable temperature. The products of the chemical change occurring on the catalyst are oxids of nitrogen, steam and all the nitrogen originally present in the air used in making the initial mixture of ammonia gas and air. The first product of the oxidation is known to be nitric oxid (NO) and the reaction may be represented by the equation:—

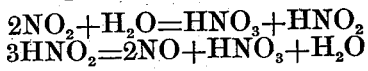

In the subsequent absorption process it is necessary to add a further quantity of air sufficient at least to oxidize the nitric oxid (NO) to nitric anhydrid ($N_2O_5$), the latter at once being converted by the water present to nitric acid ($HNO_3$):

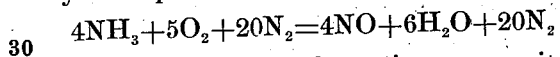
$$= 2N_2O_5 + 32N_2.$$

The composition of the gas passing to the absorption towers will therefore, as a maximum, be 5.9% by volume of oxids of nitrogen and 94.1% by volume of inert nitrogen. The presence of this large volume of inert gas interferes very much with the subsequent processes of oxidation, and absorption as carried out in the absorption towers, the chief influence being apparently the very marked increase in the time required for the oxidation of the nitric oxid (NO) to nitrogen dioxid in the oxidation towers, and for the re-oxidation of the same gas (NO) produced by the interaction of nitrogen dioxid and water in the absorption towers according to the equations:—

$$2NO_2 + H_2O = HNO_3 + HNO_2$$
$$3HNO_2 = 2NO + HNO_3 + H_2O$$

Thus, according to the experiments of Lunge and Berl (*Zeit. Angew. Chem.* 18 807, 1906, 20, 1713, 1907) the times required for the oxidation of nitric oxid (NO) in gases of different dilutions are as follows:—

| % NO in air. | Time in minutes for 95% NO to be oxidized to $NO_2$. |
|---|---|
| 10 | 0.5 |
| 1 | 9 |
| 0.1 | 90 |

As the oxids of nitrogen in the gases are absorbed and the residual oxids become more and more dilute, the re-oxidation takes more and more time, and with any practical system of absorbing towers, some oxids of nitrogen always escape in the form of nitric oxid (NO) which has not had a sufficient time of contact to become oxidized to nitrogen dioxid ($NO_2$).

Proposals have hitherto been made to overcome these disadvantages by the employment of oxygen or air enriched with oxygen in order to obtain as large a concentration as possible of oxids of nitrogen.

It is known however that mixtures of ammonia and oxygen in certain proportions are explosive and an excess of oxygen has to be provided to prevent this risk, thus largely increasing the cost of the process.

According to my invention I obviate this disadvantage by the use of steam in admixture with the oxygen and ammonia so that I am enabled to use the least quantity of oxygen to secure effective oxidation without any risk of explosions occurring.

The invention also consists in a process for the oxidation of ammonia according to which a solution of ammonia in water is sprayed into a heated chamber or tube through which oxygen is passed, the mixture then passing on to the catalyst converter.

In carrying my invention into effect in one convenient manner, I first cause the ammonia prior to its passage through the catalyst converter to be admixed with pure oxygen or air enriched with oxygen or a gas rich in oxygen obtained in any suitable manner as, for example, by the fractionation of liquid air.

I have found that a mixture of ammonia gas and oxygen so obtained, in the proportions to form $NO$, $N_2O_3$, $N_2O_4$, or $N_2O_5$, may then be rendered non-explosive by admixing it with steam if the temperature of the mixture be kept above the condensing point of steam, and this mixture may then be oxidized by passing it over a suitable catalyst, such as heated platinum gauze, with the production of a nearly quantitative yield of oxids of nitrogen.

According to the proportion of oxygen employed the gas after oxidation may then have the steam condensed by cooling, leaving the particular oxid of nitrogen concerned in a state of purity, or the gas may be cooled in the presence of sufficient oxygen or otherwise to produce liquid nitric acid ($HNO_3$).

Further, since the diluent gas probably acts at least partially by its own cooling effect it is evident that a less volume of steam will produce the same effect as the four volumes of nitrogen associated in air with the one volume of oxygen since the specific heat of steam is higher than that of nitrogen in the ratio of 1.2 to 1.0 for equal volumes. The output for a given area of catalyst may therefore be made greater than is the case when air alone is used. As above stated the oxygen may be employed in admixture with ammonia in the proportions necessary to form $N_2O_3$, $N_2O_4$, or $N_2O_5$ and the mixtures are rendered non-explosive by the addition of sufficient steam.

As examples of the amount of steam necessary I may give the following compositions of gas suitable for catalytic oxidation:—

|  | I. ($N_2O_3$). | II. ($N_2O_4$). | III. ($N_2O_5$). |
|---|---|---|---|
| Percentage ammonia by volume... | 14.5 | 10.0 | 16.2 |
| Percentage oxygen by volume..... | 22.5 | 17.7 | 32.8 |
| Percentage steam by volume...... | 63.0 | 72.3 | 51.0 |

These mixtures will be converted into oxids of nitrogen in an almost quantitative manner on a heated platinum gauze catalyst, and the temperature of the latter is maintained at a suitable point by the heat of oxidation alone, without external heating beyond that of preheating the initial mixture to 250° C.

Any one of these mixtures may be used, but if the object is to produce nitric acid it is advisable to use III which contains sufficient oxygen, whereas if nitric oxid is to be produced, I or II must be used, when some nitric acid is obtained as well by interaction of the higher oxids of nitrogen with water according to the equations already given above.

It is seen that mixture III, although containing more oxygen than I or II, is richer in ammonia, since the amount of steam is reduced on account of the diluting effect of the oxygen. Thus, with this mixture the output of the converter and the strength of the resulting nitric acid produced by condensation are both increased as compared with mixtures I and II. In this respect the conditions are exactly contrary to those obtaining in the case of air, when the $N_2O_3$ mixture has, of course, a higher ammonia content than the other two.

If in the oxidation process nitric acid is to be formed it is therefore advisable to add the whole of the oxygen required to produce nitric acid to the original mixture supplied to the converter (in the form of mixture No. III) rather than to add a portion of it as secondary oxygen after the oxidation in the converter.

It is not advisable to add less steam or oxygen than the proportions given above, but more of either or both may be used if desired in order to regulate the temperature of the catalyst.

The mixture is maintained at a temperature above the condensation point of steam, as for example, by passing through heated tubes of aluminium or other material not attacked by the gas and is then led to the ammonia oxidation converter in which the gas is passed through the catalyst which may, for example, consist of heated platinum gauzes. The oxidized product is then cooled in the presence of sufficient additional oxygen to form nitric acid which is obtained in the dilute form and in general it is not necessary to employ any absorption towers since the reaction proceeds with sufficient rapidity to insure complete absorption even within the comparatively small volume of the cooling apparatus.

To avoid explosions, which would occur if the supply of steam be interrupted, I may produce the mixture of ammonia, oxygen and steam, by spraying a solution of ammonia in water into a heated chamber or tube through which oxygen is passing, the rates of admission of ammonia solution and of oxygen being adjusted in suitable proportions. Thus, a solution containing 24% $NH_3$ may be sprayed into oxygen gas in such proportions that the mixture obtained has the composition given in III above. The proportions of steam and ammonia are adjusted by starting with an aqueous solution of ammonia of known and fixed composition, and it is evident that it will in no case be necessary to start with a solution of ammonia containing more ammonia than is present in a solution saturated under atmospheric pressure, containing 33% $NH_3$ and of specific gravity 0.880 so that the process need not be carried out under pressure.

An example of one form of apparatus which I have found satisfactory is shown more or less diagrammatically in the accompanying drawing, and in which I employ a spiral $a$ of aluminium or other suitable tubing as an evaporator through which a regulated current of oxygen or enriched air (entering at say $b$) is passed and which is maintained at a temperature above 150° C. by any suitable means and into this current of oxygen or enriched air I force a current or spray of ammonia solution through a nozzle $c$ and valve $d$ adjacent to the oxygen inlet valve $b$. The liquid is completely evaporated in the spiral and the gas mixture passes to a preheater composed, for example, of a number of aluminium pipes $e$ in a chamber $f$, heated by hot gases or otherwise to about 250° C. To produce more rapid evaporation and to assist in the mixing of the oxygen, steam and ammonia, the evaporating tube may be wholly or in part packed with turnings of aluminium, or other suitable filling. If desired the gas mixture produced in the spiral may be enriched with either ammonia or oxygen by admitting a supply to the system between the evaporator and the preheater, or I may also spray water or admit steam into the evaporator and add ammonia gas through the intermediate supply. If ammonia gas be added at a point outside the evaporator provision should be made to insure efficient mixing as, for example, by passing the gases through a second coil of tubing.

After passing through the preheater the gas mixture enters the catalyst converter $g$ which may be of any usual or desired form and which may be heated by means of hot gases or otherwise to a suitable temperature. If the mixture employed be that required for forming $N_2O_3$ or $N_2O_4$ a further supply of oxygen may be admitted (as at $h$) to the cooler $i$ to which the gases pass from the converter and the liquid acid may be withdrawn through an outlet $k$ in the lower part of the cooler while, if necessary or desirable, there may be a second outlet $l$ from the cooler which is connected with an absorption tower in which any residual oxids of nitrogen may be absorbed.

If it be desired to produce nitric oxid no further addition of oxygen will be needed and the steam condensed in the cooler carrying down the minimum of oxids of nitrogen in the form of nitric acid may be withdrawn through the outlet from the cooler while the nitric oxid free from higher oxids may be passed on, dried by refrigeration or in a tower with sulfuric acid or otherwise and then collected.

It may also, if desired, be mixed after the drying with sufficient oxygen to convert it into nitrogen dioxid ($NO_2$) the latter being separated in a pure state in the liquid form by cooling.

It will be understood that the invention is not to be confined to the constructional details hereinbefore given by way of example as any other suitable form of apparatus may be employed for the purpose, and the proportions in which the mixtures are passed through the apparatus, the means by which such mixtures are produced and the manner adopted for forming the individual constituents of the mixtures may be suitably modified to suit any given practical requirements.

Having now particularly described and ascertained the nature of my said invention and in what manner the same is to be performed, I declare that what I claim is:—

1. A process for the oxidation of ammonia which consists in forming a mixture of ammonia and steam in the presence of oxygen, preheating the mixture of ammonia steam and oxygen, and subsequently passing such mixture into contact with a heated catalyst.

2. A process for the oxidation of ammonia which consists in introducing a stream of an aqueous solution of ammonia into a heated chamber through which oxygen is passed and subsequently passing the mixture of ammonia, steam and oxygen so produced into contact with a heated catalyst.

3. A process for the oxidation of ammonia which consists in spraying an aqueous solution of ammonia into a heated chamber through which oxygen is passed, preheating the mixture of ammonia steam and oxygen so produced and subsequently passing said mixture into contact with a heated catalyst.

In testimony whereof I have signed my name to this specification.

JAMES RIDDICK PARTINGTON.